US011274485B2

(12) United States Patent
Kleyer et al.

(10) Patent No.: US 11,274,485 B2
(45) Date of Patent: Mar. 15, 2022

(54) RETAINING ELEMENT FOR A VEHICLE SIDE WINDOW THAT CAN BE RAISED AND LOWERED

(71) Applicant: SAINT-GOBAIN GLASS FRANCE, Courbevoie (FR)

(72) Inventors: Dieter Kleyer, Würselen (DE); Jan-Uwe Oltrogge, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 22 days.

(21) Appl. No.: 16/772,354

(22) PCT Filed: Oct. 29, 2018

(86) PCT No.: PCT/EP2018/079561
§ 371 (c)(1),
(2) Date: Jun. 12, 2020

(87) PCT Pub. No.: WO2019/115079
PCT Pub. Date: Jun. 20, 2019

(65) Prior Publication Data
US 2021/0071459 A1 Mar. 11, 2021

(30) Foreign Application Priority Data
Dec. 12, 2017 (EP) .................................... 17206582

(51) Int. Cl.
*B60J 1/16* (2006.01)
*E05F 11/38* (2006.01)
(Continued)

(52) U.S. Cl.
CPC ............. *E05F 11/385* (2013.01); *B60J 1/006* (2013.01); *B60J 1/17* (2013.01); *E05D 15/165* (2013.01);
(Continued)

(58) Field of Classification Search
CPC . E05F 11/385; B60J 1/006; B60J 1/17; B62D 65/06; E05D 15/165;
(Continued)

(56) References Cited

U.S. PATENT DOCUMENTS 4,026,088 A * 5/1977 Akabane ............... E05F 11/385
52/716.5
D273,459 S * 4/1984 Akabane ....................... D8/354
(Continued)

FOREIGN PATENT DOCUMENTS

CN 1396980 A 2/2003
CN 204236202 U 4/2015
(Continued)

OTHER PUBLICATIONS

International Search Report as issued in International Patent Application No. PCT/EP2018/079561, dated Jan. 31, 2019.
(Continued)

*Primary Examiner* — Jerry E Redman
(74) *Attorney, Agent, or Firm* — Pillsbury Winthrop Shaw Pittman LLP

(57) ABSTRACT

A retaining element for a side window of a vehicle, includes at least one contact section for securing to a first surface of the side window, wherein the contact section has a contact surface that is provided for being connected to the first surface via an adhesive, a securing section connected to the contact section and for securing to the vehicle, and a filling opening for injecting the adhesive into the intermediate space between the contact section and the first surface of the side window, wherein the contact surface has a plurality of channels that are directed toward the filling opening and are distributed over the contact surface in a fan-like manner.

19 Claims, 3 Drawing Sheets

(51) Int. Cl.
  *B60J 1/00* (2006.01)
  *B60J 1/17* (2006.01)
  *E05D 15/16* (2006.01)

(52) U.S. Cl.
  CPC ....... *E05Y 2201/64* (2013.01); *E05Y 2900/55* (2013.01)

(58) Field of Classification Search
  CPC ............. E05Y 2201/64; E05Y 2900/55; E05Y 2600/526; E05Y 2600/53; E05Y 2600/60
  USPC .................................................. 49/374, 375
  See application file for complete search history.

(56) References Cited

U.S. PATENT DOCUMENTS

| | | | |
|---|---|---|---|
| D273,560 S * | 4/1984 | Akabane | D8/354 |
| 4,762,904 A | 8/1988 | Nakama | |
| 4,987,699 A * | 1/1991 | Gold | B60J 10/34 49/375 |
| 5,513,468 A * | 5/1996 | Diestelmeier | E05F 11/385 49/351 |
| 5,765,310 A | 6/1998 | Gold | |
| 5,987,820 A * | 11/1999 | Shibanushi | E05F 11/445 49/375 |
| 6,349,504 B1 * | 2/2002 | Schmitt | E05F 11/385 49/375 |
| 8,209,908 B2 * | 7/2012 | Mori | E05F 11/385 49/374 |
| 9,970,226 B2 * | 5/2018 | Stewart | E05F 15/689 |
| 10,487,558 B2 * | 11/2019 | Walawender | B60J 1/17 |
| 2003/0093960 A1 * | 5/2003 | Mizusawa | E05F 11/385 52/204.62 |
| 2003/0196384 A1 * | 10/2003 | Kang | E05F 11/385 49/375 |
| 2017/0284140 A1 * | 10/2017 | Sase | E05F 11/385 |
| 2017/0306677 A1 * | 10/2017 | Kosaka | E05F 11/385 |
| 2019/0178019 A1 * | 6/2019 | Takahashi | B60J 1/17 |

FOREIGN PATENT DOCUMENTS

| | | |
|---|---|---|
| DE | 33 20 157 A1 | 12/1984 |
| DE | 43 40 363 A1 | 6/1995 |
| EP | 1 299 611 A2 | 4/2003 |
| EP | 1 745 190 A1 | 1/2007 |
| EP | 1 935 557 A1 | 6/2008 |
| EP | 1 935 558 A1 | 6/2008 |
| EP | 1 936 087 A1 | 6/2008 |
| EP | 1 936 088 A1 | 6/2008 |
| JP | S63-059720 U | 4/1988 |
| JP | 2003-520726 A | 7/2003 |
| JP | 2006-274679 A | 10/2006 |
| JP | 2007-146458 A | 6/2007 |
| JP | 4209132 B2 | 1/2009 |
| RU | 28509 U1 | 3/2003 |
| RU | 120924 U1 | 10/2012 |
| WO | WO 01/55542 A1 | 8/2001 |
| WO | WO 01/098613 A2 | 12/2001 |
| WO | WO 2005/098187 A1 | 10/2005 |
| WO | WO 2015/170553 A1 | 11/2015 |
| WO | WO 2016/117451 A1 | 7/2016 |

OTHER PUBLICATIONS

Search Report as issued in Russian Patent Application No. 2020122937, dated Oct. 7, 2020.
Notice of Reasons for Rejection as issued in Japanese Patent Application No. 2020-531944, dated Jul. 6, 2021.
Examination Report as issued in Indian Patent Application No. 202017021365, dated Mar. 26, 2021.
First Office Action as issued in Chinese Patent Application No. 201880003337.4, dated Feb. 25, 2021.

* cited by examiner

A - A'

| Arranging a retaining element 1 according to the invention relative to a side window I, wherein the contact surface 2a of the retaining element 1 and the first surface 1a of the side window I face one another. |
|---|
| Injecting an adhesive 9 through a filling opening 6 of the retaining element 1 |

RETAINING ELEMENT FOR A VEHICLE SIDE WINDOW THAT CAN BE RAISED AND LOWERED

CROSS-REFERENCE TO RELATED APPLICATIONS

This application is the U.S. National Stage of PCT/EP2018/079561, filed Oct. 29, 2018, which in turn claims priority to European patent application number 17 206 582.3 filed Dec. 12, 2017. The content of these applications are incorporated herein by reference in their entireties.

FIELD

The invention relates to a retaining element for a side window of a vehicle, a side window equipped therewith as well as a method for its production and use thereof.

BACKGROUND

Motor vehicles typically have openable side windows. Such side windows are provided with a side pane that can be moved by substantially vertical displacement (i.e., raising and lowering), by which means the side window can be opened and closed. In order to be able to move the window, it is connected to a mechanism in the interior of the vehicle body.

For connecting the side window to the raising and lowering mechanism, the side window can be provided with one or a plurality of holes in the region of its lower edge. Alternatively, one or a plurality of retaining elements can also be attached, in particular glued, to the side window in the region of the lower edge. Such retaining elements usually have a substantially Y-shaped cross-section with two contact sections that are glued to the two surfaces of the side window and to which a common securing section is connected via a step in each case. The securing section is connected to the lower edge of the side window and is equipped with a hole for connecting to the raising and lowering mechanism. Such Y-shaped retaining elements are known, for example, from campaign that EP1936088A1, EP1936087A1, EP1935557A1, EP1935558A1, EP1745190A1, EP1299611A2, and DE4340363A1.

Typically, prior art Y-shaped retaining elements are placed on the lower edge of the side window. Then, the adhesive is applied, in particular, through filling openings in the contact sections. To prevent escape of the adhesive from the intermediate space between the contact section and the pane surface, it is necessary to seal this intermediate space with a sealing device that rests against the side edges of the contact sections. Alternatively, leaked adhesive can be removed in a subsequent step. Both the use of the sealing element and the subsequent removal of leaked adhesive make the attachment of the retaining element complex. U.S. Pat. No. 4,762,904 discloses a retaining element whose contact surfaces are in each case equipped with a channel for lateral injection of the adhesive.

DE3320157A1 discloses a retaining element whose contact surface is implemented with depressions, incisions, or perforations to increase the contact area for the adhesive.

SUMMARY

The object of the present invention is to provide an improved retaining element that can be attached even without the use of a sealing device, wherein the escape of adhesive from the intermediate space between the retaining element and the pane surface is prevented or at least reduced.

The object of the present invention is accomplished according to the invention by a retaining element in accordance with claim 1. Preferred embodiments are apparent from the dependent claims.

In an aspect of the invention, there is provided a retaining element for a side window of a vehicle, comprising at least one contact section for securing to a first surface of the side window, wherein the contact section has a contact surface that is provided for being connected to the first surface via an adhesive, a securing section connected to the contact section and for securing to the vehicle, and a filling opening for injecting the adhesive into the intermediate space between the contact section and the first surface of the side window, wherein the contact surface has a plurality of channels that are directed toward the filling opening and are distributed over the contact surface in a fan-like manner.

In another aspect of the invention, there is provided, a side window for a vehicle, having a first surface, a second surface opposite thereto, and a lower edge, and having at least one retaining element as described herein attached in the region of the lower edge, wherein the at least one contact section is secured to the first surface by means of an adhesive.

In yet another aspect of the invention, there is provided a method for producing a side window having a retaining element for a vehicle, comprising providing a retaining element as described herein and a side window having a first surface, a second surface opposite thereto, and a lower edge, arranging the retaining element in the desired position relative to the side window, wherein the contact surface is directed toward the first surface, and injecting an adhesive through the filling opening into the intermediate space between the contact surface and the first surface.

Moreover, in an aspect of the invention, there is provided a method comprising utilizing a side window as described herein as an openable side window of a motor vehicle.

BRIEF DESCRIPTION OF THE DRAWINGS

In the following, the invention is explained in detail with reference to drawings and exemplary embodiments. The drawings are a schematic representation and not to scale. The drawings in no way restrict the invention.

They depict.

DETAILED DESCRIPTION

Figure 1:
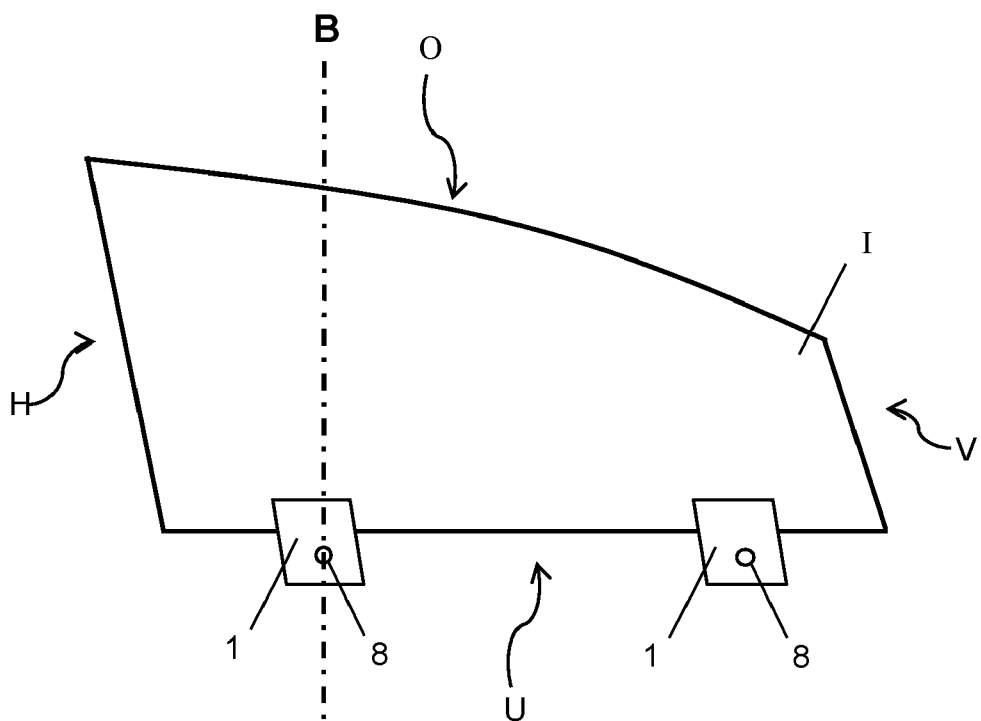
FIG. 1 a plan view of a side window with two generic retaining elements.

The retaining element according to the invention for a side window of a vehicle comprises at least one contact section and a securing section connected thereto, in particular rigidly connected thereto. The contact section is intended and suitable to be secured to a first surface of the side window. The contact section has a contact surface that is intended to face the first surface of the side window or to be directed toward it and to be connected to this first surface via an adhesive. The securing section intentionally protrudes beyond the lower edge of the side window and is intended and suitable for securing to the vehicle. For this purpose, the securing section is connected to a raising and lowering mechanism of the side window within the vehicle body.

According to the invention, the contact surface of the contact section has channels. In the context of the invention, "channel" refers to an elongated depression made in the contact surface, which otherwise spans a flat or curved surface, in particular is flat. According to the invention, the channels are provided to influence the flow behavior, in particular the flow direction, of an adhesive injected into the intermediate space between the contact section and the side window and can, therefore, also be referred to as flow channels. The channels are, in particular, intended to improve the distribution of the adhesive over the contact surface. To ensure sufficient wetting of the contact surface and of the part of the pane surface opposite it, in prior art retaining elements either the intermediate space between the contact surface and the pane surface must be sealed or a considerable escape of adhesive from the intermediate space must be accepted and subsequently removed. The design according to the invention of the contact surface with flow channels results in improved distribution of the adhesive over the contact surface such that its sufficient wetting is achieved without adhesive escaping or at least with greatly reduced leakage of adhesive. Thus, it is possible to dispense with sealing the intermediate space between the contact section and the side window or with subsequent processing for removal of excess adhesive, which decisively simplifies and accelerates the production process. That is the advantage of the present invention.

Typically, the at least one contact section is connected to the securing section via a step section. The step section causes the securing section to be offset relative to the contact section, in particular in the direction in which the contact surface faces. To produce the offset, the angles between the step section and the contact section and the angles between the step section and the securing section are greater than 0° and less than 180°, typically greater than or equal to 45° and less than 180°. The lateral offset between the contact section and the securing section enables arranging the securing section protruding beyond the lower edge of the side window in the plane of the side window in the installed position. In other words, the securing section is directed toward the lower edge of the side window. This is advantageous in terms of the position of the center of gravity and the space required in the vehicle body.

The retaining element has at least one filling opening. This means a passage through the retaining element that is intended and suitable for injecting adhesive from the side of the retaining element facing away from the side window through the retaining element into the intermediate space between the contact section and the pane surface. Such filling openings are also common in prior art retaining elements. The area of the filling opening is typically from 0.5 mm$^2$ to 25 mm$^2$, preferably from 2 mm$^2$ to 12 mm$^2$. The channels are arranged in the contact surface such that an adhesive injected through the filling opening into the intermediate space is distributed more evenly over the contact surface compared to a retaining element with a conventional contact surface with no channel. In particular, at least 95% of the contact surface and of the region of the pane surface opposite it should be wetted with adhesive before the adhesive begins to escape from the intermediate space or flow beyond the contact surface. The exact arrangement of the channels can be implemented in various ways.

The filling opening can be in the contact section or in the step section or even span the boundary between the two regions.

The person skilled in the art can select the geometric arrangement of the channels in a suitable manner depending on the requirements in the individual case in order to achieve the objective according to the invention of the most homogeneous distribution possible of the adhesive over the contact surface. The channels are directed toward the filling opening such that the adhesive is distributed over the contact surface starting from the filling opening. In other words, the channels point toward the filling opening. The channels can extend all the way to the filling opening; alternatively, the channel ends facing the filling opening can have a distance from the filling opening. In principle, even a single channel that runs, for example, around the filling opening like a snail shell can be sufficient.

The contact surface has a plurality of channels. The channels are directed toward the filling opening and distributed in a fan-like manner over the contact surface or a region of the contact surface. This means that the individual channels extend radially between the filling opening and the side edges of the contact surface. In other words, the channels radiate, so to speak, from the filling opening such that the distance between adjacent channels increases with the growing distance from the filling opening. The channels can run all the way to the side edges or end before them. Preferably, the channels do not run all the way to the side edges, but, instead, end before them such that the escape of adhesive beyond the contact surface is minimized. The distance of the channel ends from the side edge of the contact surface is preferably from 2 mm to 15 mm, particularly preferably from 3 mm to 8 mm. The channels can extend all the way to the filling opening or have a distance from the filling opening, with the former being preferred.

The contact surface typically has a polygonal, in particular a rectangular shape. In an advantageous embodiment, one channel is associated with at least one corner of the contact surface, toward which it is directed. Preferably, associated in each case with the corner or corners of the contact surface that are farthest from the filling opening is a channel that is directed toward them. Since the filling opening is typically arranged near the edge of the filling opening facing the securing section, said corners are typically the corners of the contact surface facing away from the securing section. The adhesive is then advantageously conveyed into the region of these corners far from the filling opening, significantly improving the homogeneity of the distribution of the adhesive.

The width and depth of the channels can be suitably selected by the person skilled in the art based on the requirements in the individual case. The suitable width and depth depends in particular on the viscosity of the adhesive, with higher viscosity making wider and deeper channels necessary. The width of the channels is typically from 0.5 mm to 3 mm, preferably from 1 mm to 2 mm. The depth of the channels is typically from 0.5 mm to 2 mm, preferably from 1 mm to 1.5 mm. Good results are obtained with these values, in particular with the use of a common adhesive with a viscosity from 1 Pa×s to 150 Pa×s. The width and/or the depth of an individual channel can also be variable. For example, it can be advantageous for the width and/or depth of the channel to be reduced with increasing distance from the filling opening in order to take into account the reduced amount of adhesive to be transported into the outer regions of the contact surface.

The securing section typically has a passage (assembly hole) intended and suitable for securing to the vehicle. The passage is provided for securing the retaining element to the vehicle, in particular, to the raising and lowering mechanism of the side window. The passage is usually essentially circular, for which most prior art securing systems are designed. However, depending on the requirements in the individual case, the passage can also have any other shape, for example, an elliptical shape or even an irregular shape. The size of the passage is usually at least 20 mm$^2$, in particular from 20 mm$^2$ to 2000 mm$^2$, preferably from 80 mm$^2$ to 700 mm$^2$. The passage is ideally roughly circular with a diameter from 5 mm to 50 mm, preferably from 10 mm to 30 mm.

In one embodiment of the invention, the retaining element is a retaining element to be secured on one side of the side window. Such a retaining element is intended to be connected to only a single surface of the side window. For this purpose, the retaining element typically has exactly one single contact section, which is rigidly connected to the securing section, preferably via a step section.

In another embodiment of the invention, retaining element is a retaining element to be secured on both sides of the side window. Such a retaining element is intended to be connected to the two opposite surfaces of the side window. For this, the retaining element has a first contact section and a second contact section, which are rigidly connected to the common securing section. The first contact section is intended to be secured to the first surface of the side window. The second contact section is intended to be secured to the second surface of the side window, which is opposite the first surface. The two contact sections are arranged opposite one another such that their respective contact surfaces face one another. The retaining element has a substantially Y-shaped cross-section. The contact surfaces of both contact sections are preferably formed with the channels according to the invention and particularly preferably have in each case a filling opening toward which the channels are directed.

In the case of the retaining element to be secured on both sides, the first contact section is preferably rigidly connected to the common securing section via a first step section; and the second contact section, via a second step section. Particularly preferably, the two step sections have the same geometry, in particular the length and the angle relative to the adjacent sections. This has the advantage that, in the installed position, the securing section is arranged centrally between the contact sections and in the plane of the side window, which is advantageous in terms of the position of the center of gravity and the space required in the vehicle body.

The retaining element is preferably made of a metal, a metal alloy, or a plastic, particularly preferably aluminum, steel, stainless steel, or thermoplastics with or without glass fibers, glass beads, or similar reinforcements as well as blends thereof with additional plastics. Suitable thermoplastics are, for example, polyamides (PA), polybutylene terephthalates (PBT), or polyethylene terephthalate (PET). The retaining element is most particularly preferably made of aluminum, PET, or polyamide 66. Suitable materials are, for example, available under the tradenames Technyl, Zytel, Ultramid, Schulamid, Ultradur, Arnite, Duranex, Crastin, Bergadur, Pocan, or Grivor. Also conceivable are combinations of the materials mentioned. Preferably, however, the entire retaining element is made in one piece and of the same material. If the retaining element is made of a plastic, this plastic is preferably glass-fiber-reinforced or carbon-fiber-reinforced. For frameless side windows, retaining elements made of metals or metal alloys are preferable due to their greater stability. For side windows including frames, retaining elements made of plastic are preferred due to their lower weight—the lower stability of the plastic retaining elements compared to metal retaining elements is compensated here, in the closed state of the window, by the stabilizing effect of the frame.

The contact section and the securing section are platelike, typically, essentially rectangular, although other shapes are also conceivable. The material thickness of the securing section and the contact section and, optionally, the step section is preferably from 1 mm to 10 mm, particularly preferably from 2 mm to 5 mm, for example, 3.5 mm. This provides good stability without requiring excessive space and excessive material. Preferably, the contact sections, the securing sections, and, optionally, the step sections have the same material thickness.

The width of the contact section, the securing section, and, optionally, the step section is preferably from 1 cm to 100 cm, particularly preferably from 2 cm to 15 cm, for example, 10 cm. This provides good stability; in particular, the contact sections provide sufficiently large adhesion surfaces for connecting to the side window.

The length (or height) of the contact section is preferably from 1 cm to 6 cm, particularly preferably from 2 cm to 4 cm, for example, 3 cm. This provides good stability; in particular, the contact sections provide sufficiently large adhesion surfaces for connecting to the side window. The area of the contact section is preferably from 5 cm$^2$ to 500 cm$^2$, particularly preferably from 10 cm$^2$ to 50 cm$^2$, for example, 30 cm$^2$.

The length (or height) of the securing section is preferably from 2 cm to 15 cm, particularly preferably from 4 cm to 10 cm, for example, 8 cm. In this range, the securing section is particularly advantageously suited for connecting to conventional mechanisms for raising and lowering the side window. The length of the step section is, for example, from 2 mm to 10 mm.

In the context of the invention, "width" refers to the dimension along the lower edge of the side window in the installed position. "Length" (or height) means the dimension perpendicular thereto, which is arranged substantially parallel to the plane of the side window in the installed position. The contact area of a contact section to the side window, for example, is the product of the length and width of the contact section. The material thickness is the dimension perpendicular to the plane of the side window in the installed position.

The securing section and the contact section can be planar. The curvature of the side window is then compensated by the layer of adhesive. Alternatively, however, the contact section and/or the securing section can also be curved and, thus, be adapted, for example, to the curvature of the side window and reproduce it, and, in the case of the securing section, continue it.

The invention also includes a side window with a retaining element. The side window is intended, as a vehicle side window, for separating a vehicle interior from an external environment. The side window has an upper edge, a lower edge, a front edge, and a rear edge. The side window also has a first surface (primary surface) and a second surface (primary surface) opposite the first surface, between which said edges extend. At least one retaining element according to the invention is attached to the side window in the region of the lower edge. This means that a region adjacent the lower edge is covered by the retaining element and that the retaining element extends from there beyond the lower edge. The contact section of the retaining element is adhesively secured to the first surface of the side window, with the adhesive connection made by means of an adhesive. Typically, the lower edge of the side window is provided with two retaining elements.

"Upper edge" refers to the side edge of the side window that points upward in the installed position. "Lower edge" refers to the side edge that points downward toward the ground in the installed position. "Front edge" refers to the side edge that is oriented forward in the direction of travel. "Rear edge" refers to the side edge that is oriented backward in the direction of travel.

The side window according to the invention is preferably an openable, in particular raisable and lowerable, side window of a motor vehicle, in particular of a passenger car. This means a pane for a side window that can be opened and closed again by substantially vertical displacement of the side window into the car body. Typically, such windows have a plurality of, in particular two, retaining elements that are mounted in the region of the lower edge, where they are hidden in the vehicle body in the open state and also in the closed state of the window. Each retaining element has a passage, provided for connecting to a raising mechanism arranged in the vehicle body, typically a vehicle door, in order to secure the pane, in particular by inserting a securing section of the raising mechanism, for example, a securing pin, into the passage. The side window can be frameless or framed. A framed side window has a complete body frame around the window opening such that, in the closed state, all side edges of the side window are overlapped within the vehicle body—when raised, the side window is, so to speak, guided into the body frame. In the case of a frameless side window, there is no such body frame. Instead, the upper edge, the front edge, and the rear edge of the side window are exposed in the closed state.

The at least one contact section is secured to the first surface of the side window via an adhesive layer. When the retaining element is a retaining element to be attached on both sides with two contact sections, the first contact section is secured to the first surface of the side window via a first adhesive layer; the second contact section, to the second surface of the side window via a second adhesive layer. The thickness of a single adhesive layer is preferably from 0.5 mm to 5 mm, particularly preferably from 1 mm to 4 mm. Prior art retaining elements are typically secured to the side window via adhesive layers of approx. 1 mm thickness in each case. In an advantageous embodiment, thicker adhesive layers are used, preferably with a thickness of 2 mm to 4 mm. This has the advantage that variation occurring within a production series in terms of the edge curvature of the side windows can be better compensated by the thicker adhesive layer. As a result of the securing section extending lever-like from the lower edge of the pane, with conventionally attached retaining elements, the position of the connection to the raising and lowering mechanism is also subject to variation and can sometimes deviate considerably from the intended position. In contrast, as a result of the thicker adhesive layer, the precise orientation of the retaining element can be more freely selected such that the securing section can be arranged more precisely in the desired position regardless of the edge curvature of the side window. In terms of the positioning of the passage for securing to the raising mechanism, variations within a production series can thus be reduced. In the case of a retaining element to be attached on both sides, the thickness of the adhesive layers is determined by the distance of the contact sections from one another (typically determined by the design of the step sections) and the thickness of the side window, which must accordingly be taken into account during designing of the retaining element for a particular type of side window.

In a preferred embodiment, the adhesive is a high-modulus adhesive. The modulus of elasticity of the adhesive is preferably at least 20 MPa, particularly preferably at least 150 MPa, in particular at least 300 MPa, most particularly preferably from 400 MPa to 600 MPa. This ensures special stability of the connection of the side window to the retaining element. This advantage is particularly significant in the case of frameless side windows, in which the connection between the side window and element is particularly stressed, for example, by forces acting in the direction of the rear edge caused by the wind. Suitable high-modulus adhesives are, for example, polyurethane, acrylate, or epoxy adhesives.

In an advantageous embodiment, the adhesive is a fast curing adhesive such that direct demolding is possible without further stabilization measures. Fast curing can be achieved by mixing two components. Other ways are curing by introducing energy from the outside, for example, by heat or light. The so-called "open time" of the two component adhesive is between 0.5 min and 10 min, preferably between 1 min and 5 min. The curing time or setting time of the adhesive until achieving sufficient internal strength is less than 10 min, preferably from 1 min to 5 min. This has the advantage that the position of the retaining element relative to the side window is quickly fixed such that stabilization measures after attachment of the retaining element can be dispensed with. The adhesive can, however, also be a slow curing adhesive.

The side window is, as usual for a vehicle window, preferably curved such that the interior-side surface is concave and the exterior-side surface is convex. "Exterior-side surface" refers to the surface that faces the outside environment in the installed position. "Interior-side surface" refers to the surface that faces the interior in the installed position. In the context of the invention, the first surface can be the interior-side or the exterior-side surface, preferably the interior-side surface.

In one embodiment, the side window is single-pane safety glass (ESG). In this case, the side window is made of a single glass pane that is thermally or chemically toughened (tempered). The thickness of the glass pane is preferably from 2 mm to 5 mm.

In another embodiment, the side window is a laminated pane (VSG: laminated safety glass). The laminated pane comprises a first glass pane and a second glass pane that are joined to one another via a thermoplastic intermediate layer. The panes can also be referred to as outer pane and inner pane: the inner pane facing the interior in the installed position and the outer pane facing the external environment in the installed position. The exposed surfaces of the side window to which the retaining element is bonded are the surfaces of the individual panes that face away from the intermediate layer, i.e., exterior-side surface of the outer pane and the interior-side surface of the inner pane. The outer pane and the inner pane preferably have a thickness from 1 mm to 5 mm, wherein the thickness of the two panes can be the same (symmetrical panes) or also different (asymmetrical panes). The thickness of the intermediate layer is preferably from 0.3 mm to 2 mm, particularly preferably from 0.5 mm to 1 mm. The intermediate layer is typically made of a polymer film, preferably made of or based on polyvinyl butyral (PVB), ethylene vinyl acetate (EVA), or polyurethane (PU). To improve the thermal comfort in the vehicle, the intermediate layer can be made of a noise-reducing polymer film, typically comprising at least three plies, wherein the middle ply has higher plasticity or elasticity than the outer plies surrounding it, for example, as a result of a different plasticizer content.

The glass pane or glass panes is/are preferably made of soda lime glass, as is customary for window panes. The glass panes can be clear and colorless, but also tinted, cloudy, or colored.

The invention also includes a vehicle with a raising mechanism for an openable side window arranged within the car body and a side window according to the invention, wherein the raising mechanism is attached to the securing section of the retaining element or the retaining elements, preferably via a holder in the passage through the securing section.

The invention also includes a method for producing a side window having a retaining element for a vehicle. Provided are at least one retaining element according to the invention as well as a side window with a first surface, a second surface opposite thereto, and a lower edge. The retaining element is arranged in the desired position relative to the side window, with the contact surface of the at least one contact section directed toward the first surface of the side window. Here, the "desired position" refers to the intended arrangement of the retaining element relative to the side window that the completely assembled retaining element is intended to occupy. Then, an adhesive is injected into the intermediate space between the contact surface and the first surface of the side window through the filling opening provided for this. The channels of the contact surface cause homogeneous distribution of the adhesive. The adhesion surfaces can thus be wetted sufficiently without a critical amount of adhesive escaping from the intermediate space between the contact surface and the pane surface. The method can therefore advantageously be carried out without sealing the intermediate space.

In a preferred embodiment of the method, the side window is arranged and fixed in a tool in a specified position, defined, for example, by reference points on the pane. The retaining element is brought into the desired position, for example, with an assembly aid or a robot. The position of the retaining element is selected such that the securing sections of the completely assembled retaining element are arranged in the desired position relative to the pane.

In an advantageous embodiment of the method, the adhesive is a fast curing adhesive. As a result, the position of the retaining element relative to the side window is fixed sufficiently quickly such that measures for temporary positional stabilization during the curing of the adhesive can be dispensed with. The production process is thus simplified and accelerated. However, a slow curing adhesive can also be used. Then, measures for temporary positional stabilization may have to be taken, for instance, by clamping, holding, or by means of a second adhesive, for example, a hot-melt adhesive.

The retaining element itself is produced by methods customary in the art. Retaining elements made of plastic are preferably made by injection molding; retaining elements made of metal or metal alloys are made, for example, by continuous casting, die casting, milling, punching, rolling, and/or welding. The channels can, for example, be formed directly by the injection mold or can be introduced by subsequent processing.

The invention moreover includes the use of a side window according to the invention as an openable side window of a motor vehicle, preferably a passenger car, wherein the retaining element is used for securing to a raising mechanism in the vehicle body.

FIG. 1 depicts a plan view of a generic side window I, which is intended as an openable side window for the front side window of a passenger car. Two retaining elements 1, which are intended for connecting to a raising mechanism within the vehicle door, are attached in the region of the lower edge U of the side window. For this, the retaining elements 1 have passages 8 to which the raising mechanism can be secured.

Figure 2:
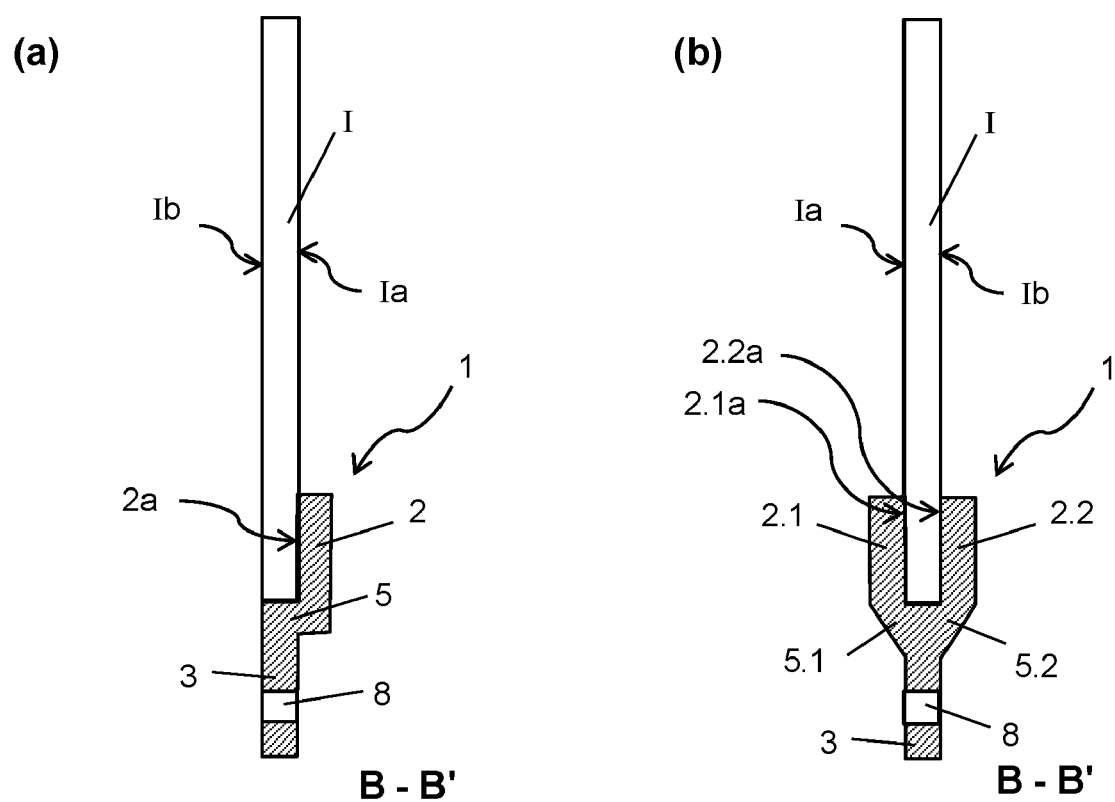
FIG. 2 a cross-section through two side windows with different embodiments of the retaining element 1, FIG. 3 a plan view of the surface of an embodiment of the retaining element 1 facing the side window I, FIG. 4 a section A-A through the retaining element 1 of FIG. 3, FIG. 5 a cross-section through another embodiment of the side window with retaining element 1, and FIG. 6 a flow chart of an embodiment of the method according to the invention.

FIG. 2 depicts a cross-section along B-B' through two different embodiments of a side window I with the retaining element 1. FIG. 2a shows a retaining element 1 attached on one side. The retaining element 1 is composed of a single contact section 2, which is secured to the first surface Ia of the side window I. For this purpose, the contact surface 2a of the contact section 2 facing the side window of the side window I is bonded to the surface Ia. A securing section 3 with the passage 8 is connected to the contact section 2 via a step section 5. The retaining element 1 covers a region of the lower edge U and a region of the surface Ia adjacent thereto. The securing section 3 protrudes beyond the lower edge U of the side window I, is offset laterally relative to the contact section 2 such that it is arranged roughly in the plane of the side window I, and is directed toward its lower edge U. FIG. 2b shows a retaining element 1 attached on both sides with an essentially Y-shaped cross-section. The retaining element 1 comprises two contact sections 2.1, 2.2 opposite one another, which are secured to the two surfaces Ia, Ib in the region of the lower edge U of the side window I. For this, the contact surface 2.1a of the contact section 2.1 facing the side window I is glued to the surface Ia, and the contact surface 2.2a of the contact section 2.2 facing the side window I is glued to the surface Ib. The retaining element 1 thus surrounds a region of the lower edge U and an adjacent region of the surfaces Ia, Ib. Adjoining the contact sections 2.1, 2.2 via, in each case, an associated step section 5.1, 5.2 is a securing section 3 that is positioned below the side window I and is directed toward the lower edge U. The securing section 3 has here, as well, a passage 8 for connecting to the raising mechanism.

The retaining elements 1 are manufactured in one piece from glass-fiber-reinforced polyamide 66. The contact section 2, 2.1, 2.2, the securing sections 3, and the step sections 5, 5.1, 5.2 have a thickness D (material thickness) of 3 mm. The width B of the retaining elements 1 is, for example, 80 mm. The length L of the contact sections 2, 2.1, 2.2 is, for example, 30 mm. The length L of the securing sections 3 is, for example, 50 mm.

For the sake of simplicity, the adhesive layers between the contact surfaces 2a, 2.1a, 2.2a and the side window I are not shown. The adhesive is, for example, DOW Betaforce 9050S with a modulus of elasticity of 400 MPa, elongation at break of 80%, tensile strength of 15 MPa, and pot life of 6 min. The thickness of the adhesive layers is, for example, 3 mm.

The side window I is, for example, implemented as single-pane safety glass (ESG) made of 3.85-mm-thick soda lime glass. For the sake of simplicity, the side window I is depicted flat in the figure; however, in reality, it has a curvature as is usual for passenger car windows.

Figure 3:
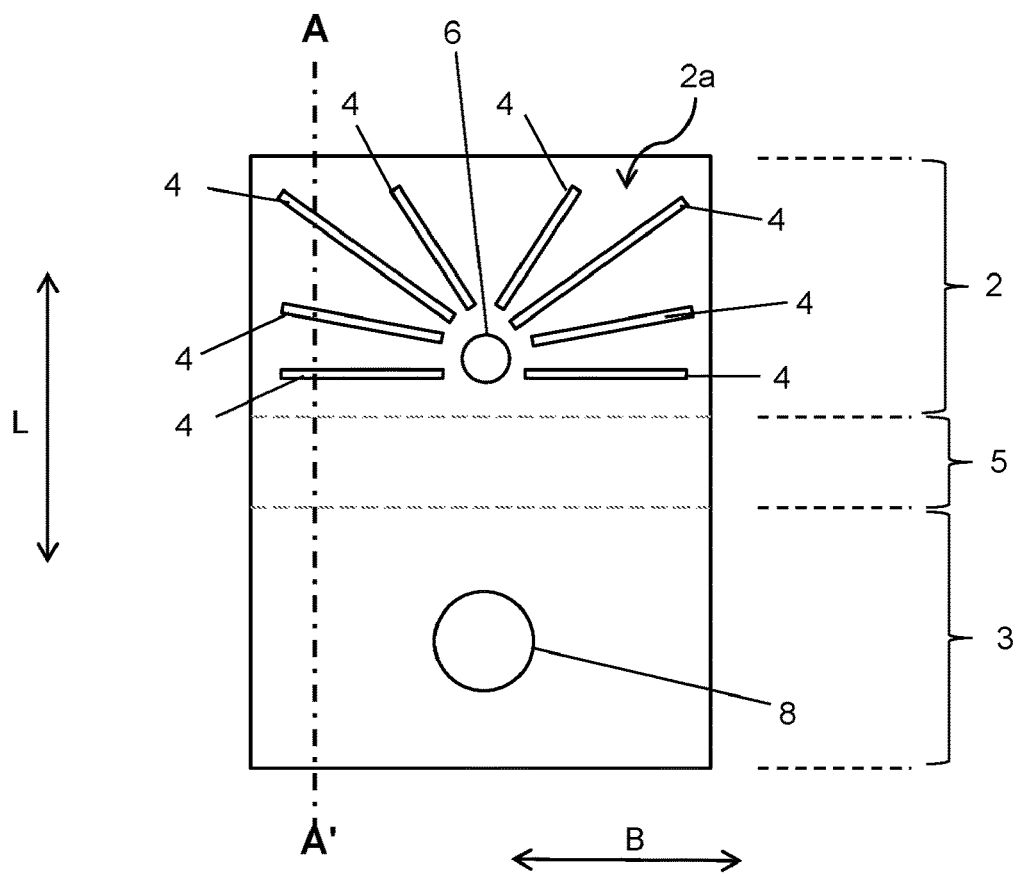

FIG. 3 depicts a plan view of the side facing the side window I of a retaining element 1 to be attached on one side according to FIG. 2a with the securing section 3 together with the passage 8, the step section 5, and the contact section 2. In the plan view, the contact surface 2a of the contact section 2, which is connected to the side window I, can be seen. The contact surface has, near the edge facing the step section 5, a filling opening 6 through which an adhesive is injected into the intermediate space between the side window I and the contact section 2 during assembly of the retaining element 1. A plurality of channels 4 are introduced into the contact surface 2a. The channels 4 are provided to distribute the adhesive injected through the filling opening 6 as homogeneously as possible over the contact surface 2a. Thus, good wetting of the contact surface 2a and the region of the surface Ia opposite it are achieved without the risk of excess adhesive escaping from the intermediate space, which had to be prevented in prior art retaining elements 1 by a sealing device or remedied by post-processing. The channels 4 are straight and are directed, on the one hand, toward the filling opening 6 and, on the other, toward the side edge of the contact surface 2a. The channels 4 are distributed in a fan-like manner around the filling opening and run radially between the filling opening 6 and the side edge of the contact surface 2a to distribute the adhesive.

The contact surfaces 2.1a, 2.2a of the retaining elements 1 of FIG. 2b are likewise implemented with the channels 4 according to the invention around filling openings 6.

In the figure, arrows indicate the dimensions of the width B and the length L in the context of the invention.

Figure 4:
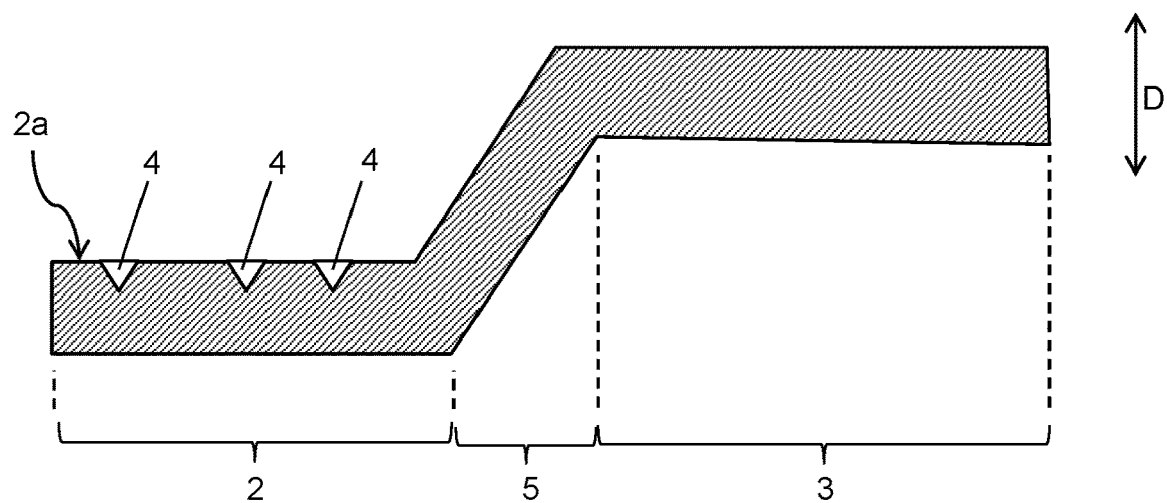

FIG. 4 depicts a section along A-A' through the retaining element 1 of FIG. 3. In addition, an arrow indicates the dimension of the thickness D (material thickness) in the context of the invention. The channels 4 that are introduced into the contact surface 2a can be seen. They have, for example, a width of 1.5 mm and a depth of 1 mm.

Figures 5, 6:
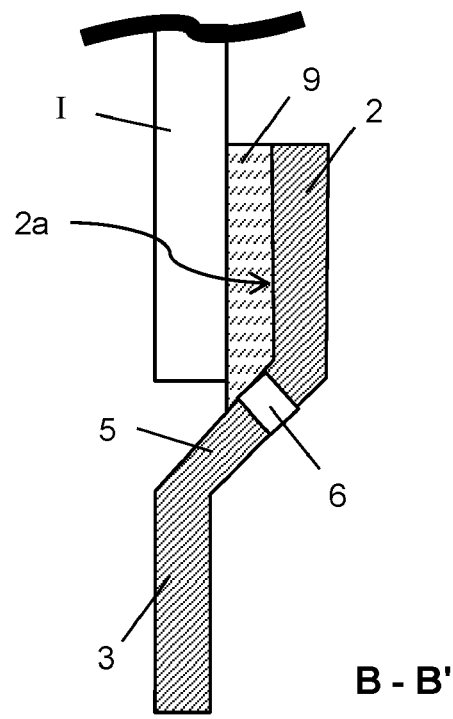

FIG. 5 depicts a cross-section along B-B' through a side window I according to the invention with another embodiment of the retaining element 1. The retaining element is to be attached on one side with a single contact section 2 and a securing section 3 connected thereto via a step section 5. Here, the filling opening 6 for injecting the adhesive 9 is arranged in the step section 5. In this case, it can be advantageous for the distribution of the adhesive 9 for the channels 4 to continue beyond the contact section 2 into the step section 5.

FIG. 6 depicts a flow chart of an exemplary embodiment of the method according to the invention for producing a side window according to the invention with a retaining element.

Since the uniform distribution of the adhesive 9 is ensured by the channels 4, the sealing of the intermediate space between the retaining element 1 and the side window I can be dispensed with at the time of injection of the adhesive 9.

LIST OF REFERENCE CHARACTERS (1) retaining element for a side window of the vehicle
(2) contact section of the retaining element 1
(2.1) first contact section of the retaining element 1
(2.2) second contact section of the retaining element 1
(2a) contact surface of the contact section 2
(2.1a) contact surface of the contact section 2.1
(2.2a) contact surface of the contact section 2.2
(3) securing section of the retaining element 1
(4) channel
(5) step section of the retaining element 1
(5.1) first step section of the retaining element 1
(5.2) second step section of the retaining element 1
(6) filling opening
(8) passage through the securing section 3
(9) adhesive I side window of a vehicle
Ia first surface of the side window I
Ib second surface of the side window I
(O) upper edge of the side window I
(U) lower edge of the side window I
(V) front edge of the side window I
(H) rear edge of the side window I
(L) length/height
(B) width
(D) thickness/material thickness
A-A' section line
B-B' section line

The invention claimed is:

1. A retaining element for a side window of a vehicle, comprising
   at least one contact section for securing to a first surface of the side window, wherein the contact section has a contact surface that is provided for being connected to the first surface via an adhesive,
   a securing section connected to the contact section and for securing to the vehicle, and
   a filling opening for injecting the adhesive into an intermediate space between the contact section and the first surface of the side window,
   wherein the contact surface has a plurality of channels that are directed toward the filling opening and are distributed over the contact surface around the filling opening and run radially between the filling opening and a side edge of the contact surface,
   wherein the filling opening (a) is arranged in a bottom half of the contact section adjacent a step section that connects the contact section to the securing section such that none of the plurality of channels extend below the filling opening or (b) is arranged in the step section such that none of the plurality of channels extend below the filling opening, and
   wherein none of the plurality of channels directly connect to the filling opening.

2. The retaining element according to claim 1, wherein the channels are suitable for influencing the flow direction of the adhesive.

3. The retaining element according to claim 2, wherein the channels are arranged such that the adhesive is distributed more evenly over the contact surface than without the channels.

4. The retaining element according to claim 1, wherein a channel is associated with at least one corner of the contact surface such that said channel is directed toward said at least one corner.

5. The retaining element according to claim 1, wherein the channels have a depth of 0.5 mm to 1.5 mm and a width of 1 mm to 2 mm.

6. The retaining element according to claim 1, which has exactly one contact section, which is connected to the securing section via the step section.

7. The retaining element according to claim 1, which has a first contact section for securing to the first surface of the side window and a second contact section for securing to an opposite second surface of the side window, wherein the first contact section is connected to the securing section via a first step section and the second contact section is connected to the securing section via a second step section.

8. A method for producing a side window having a retaining element for a vehicle, comprising:
   providing the retaining element according to claim 1 and the side window having the first surface, a second surface opposite thereto, and a lower edge, arranging the retaining element in a position relative to the side window,
wherein the contact surface is directed toward the first surface, and
injecting the adhesive through the filling opening into the intermediate space between the contact surface and the first surface.

9. The method according to claim 8, which is carried out without sealing the intermediate space between the contact surface and the first surface.

10. The method according to claim 8, wherein at least 95% of the contact surface is wetted with adhesive before the adhesive flows beyond the contact surface.

11. A side window for a vehicle, having a first surface, a second surface opposite thereto, and a lower edge, and having at least one retaining element attached in a region of the lower edge,
wherein the retaining element includes
at least one contact section for securing to the first surface of the side window, wherein the contact section has a contact surface that is provided for being connected to the first surface via an adhesive,
a securing section connected to the contact section and for securing to the vehicle, and
a filling opening for injecting the adhesive into an intermediate space between the contact section and the first surface of the side window,
wherein the contact surface has a plurality of channels that are directed toward the filling opening and are distributed over the contact surface around the filling opening and run radially between the filling opening and a side edge of the contact surface,
wherein the at least one contact section is secured to the first surface by means of the adhesive,
wherein the filling opening (a) is arranged in a bottom half of the contact section adjacent a step section that connects the contact section to the securing section such that none of the plurality of channels extend below the filling opening or (b) is arranged in the step section such that none of the plurality of channels extend below the filling opening, and
wherein none of the plurality of channels directly connect to the filling opening.

12. The side window according to claim 11, wherein the thickness of the adhesive is from 0.5 mm to 5 mm.

13. The side window according to claim 12, wherein the thickness of the adhesive is from 1 mm to 4 mm.

14. The side window according to claim 13, wherein the thickness of the adhesive is from 2 mm to 4 mm.

15. The side window according to claim 11, wherein the adhesive has a modulus of elasticity of at least 20 MPa.

16. The side window according to claim 15, wherein the adhesive has a modulus of elasticity of at least 150 MPa.

17. The side window according to claim 16, wherein the adhesive has a modulus of elasticity from 400 MPa to 600 MPa.

18. A method comprising utilizing a side window according to claim 11 as an openable side window of a motor vehicle.

19. The method according to claim 18, wherein the motor vehicle is a passenger car.

* * * * *